US008156516B2

(12) United States Patent
McClain et al.

(10) Patent No.: US 8,156,516 B2
(45) Date of Patent: Apr. 10, 2012

(54) VIRTUALIZED FEDERATED ROLE PROVISIONING

(75) Inventors: Carolyn B. McClain, Springville, UT (US); Stephen R. Carter, Spanish Fork, UT (US)

(73) Assignee: EMC Corporation, Hopkinton, MA (US)

( * ) Notice: Subject to any disclaimer, the term of this patent is extended or adjusted under 35 U.S.C. 154(b) by 964 days.

(21) Appl. No.: 11/693,165

(22) Filed: Mar. 29, 2007

(65) Prior Publication Data

US 2008/0244688 A1   Oct. 2, 2008

(51) Int. Cl.
H04L 29/06 (2006.01)
(52) U.S. Cl. .......................................................... 725/1
(58) Field of Classification Search ....... 726/1; 713/166
See application file for complete search history.

(56) References Cited

U.S. PATENT DOCUMENTS

| | | | |
|---|---|---|---|
| 5,329,626 A | 7/1994 | Klein et al. | |
| 5,826,239 A | 10/1998 | Du et al. | |
| 5,832,487 A | 11/1998 | Olds et al. | |
| 6,014,667 A | 1/2000 | Jenkins et al. | |
| 6,023,765 A | 2/2000 | Kuhn | |
| 6,067,548 A | 5/2000 | Cheng | |
| 6,088,679 A | 7/2000 | Barkley | |
| 6,157,925 A | 12/2000 | Jenkins et al. | |
| 6,202,066 B1 | 3/2001 | Barkley et al. | |
| 6,778,498 B2 | 8/2004 | McDysan | |
| 6,829,654 B1 | 12/2004 | Jungck | |
| 6,947,989 B2 | 9/2005 | Gullotta et al. | |
| 6,985,955 B2 | 1/2006 | Gullotta et al. | |
| 7,047,290 B2 | 5/2006 | Murotani et al. | |
| 7,107,332 B2 | 9/2006 | Murotani et al. | |
| 7,117,535 B1 | 10/2006 | Wecker | |
| 7,164,448 B2 | 1/2007 | Iipko et al. | |
| 7,174,458 B2 | 2/2007 | Araki et al. | |
| 7,913,300 B1 * | 3/2011 | Flank et al. ..................... 726/12 |
| 2002/0075306 A1 | 6/2002 | Thompson et al. | |
| 2002/0147801 A1 | 10/2002 | Gullotta et al. | |
| 2002/0156904 A1 | 10/2002 | Gullotta et al. | |
| 2002/0169876 A1 | 11/2002 | Curie et al. | |
| 2002/0188869 A1 | 12/2002 | Patrick | |
| 2003/0023880 A1 * | 1/2003 | Edwards et al. ............... 713/201 |
| 2003/0088574 A1 | 5/2003 | White et al. | |
| 2004/0125748 A1 * | 7/2004 | Hurtta et al. .................. 370/230 |
| 2004/0162906 A1 * | 8/2004 | Griffin et al. ................. 709/229 |
| 2004/0259277 A1 | 12/2004 | Hofmeister | |
| 2004/0268140 A1 | 12/2004 | Zimmer et al. | |
| 2005/0010811 A1 | 1/2005 | Zimmer et al. | |
| 2005/0038887 A1 * | 2/2005 | Cuervo et al. ................. 709/224 |
| 2005/0125509 A1 | 6/2005 | Ramachandran | |
| 2005/0135425 A1 | 6/2005 | Hall et al. | |

(Continued)

OTHER PUBLICATIONS

Dugan, Robert , "NPIV Functionality Profile", *IBM Corporation, INRANGE Technologies Corp*, (Aug. 5, 2002),1-7.

(Continued)

*Primary Examiner* — David Pearson
(74) *Attorney, Agent, or Firm* — Barry N. Young

(57) ABSTRACT

In various embodiments, techniques for virtualized federated role provisioning are provided. An entire policy and role provisioning environment is packaged in a first environment and sent to a second environment. The second environment authenticates and initiates the policy and role provisioning environment as a virtualized federated role provisioning service or a shared policy decision point service. The shared policy decision point service dynamically resolves policy, roles, and constraints for requesting resources within the second environment and supplies this information to a local policy enforcement point service that enforces roles on the resources.

13 Claims, 5 Drawing Sheets

U.S. PATENT DOCUMENTS

| | | | |
|---|---|---|---|
| 2005/0193196 | A1* | 9/2005 | Huang et al. .................. 713/166 |
| 2005/0246708 | A1 | 11/2005 | Turner et al. |
| 2005/0289471 | A1 | 12/2005 | Thompson et al. |
| 2006/0050888 | A1 | 3/2006 | Svensson |
| 2006/0089932 | A1 | 4/2006 | Buehler et al. |
| 2006/0144927 | A1 | 7/2006 | Love et al. |
| 2006/0200424 | A1 | 9/2006 | Cameron et al. |
| 2006/0212934 | A1 | 9/2006 | Cameron et al. |
| 2006/0282701 | A1 | 12/2006 | Davies et al. |
| 2007/0038866 | A1 | 2/2007 | Bardsley et al. |
| 2007/0112772 | A1* | 5/2007 | Morgan et al. ..................... 707/9 |
| 2007/0157297 | A1 | 7/2007 | Patrick |
| 2007/0300220 | A1* | 12/2007 | Seliger et al. ...................... 718/1 |
| 2008/0005359 | A1* | 1/2008 | Khosravi et al. ............. 709/250 |
| 2008/0010517 | A1* | 1/2008 | Locker et al. ................... 714/15 |
| 2008/0244687 | A1 | 10/2008 | McClain et al. |
| 2008/0256610 | A1 | 10/2008 | Patrick |

OTHER PUBLICATIONS

"European Application Serial No. 08102531.4 Extended European Search Report", 6 pgs.

Belsis, Petros, et al., "A scalable security architecture enabling coalition formation between autonomous domains", Proceedings of the Fifth IEEE International Symposium on Signal Processing and Information Technology, 2005. Volume , Issue , Dec. 21-21, 2005, Digital Object Identifier 10.1109/ISSPIT.2005.1577158, (Dec. 2005), 560-565.

Sandhu, R, et al., "The NIST Model for Role-Based Access Control: Toward a Unified Standard", *5th ACM Workshop Role-Based Access Control*, (Jul. 2000), 47-63.

* cited by examiner

VIRTUALIZED FEDERATED ROLE PROVISIONING

FIELD

The invention relates generally to security and more particularly to techniques for virtualized federated role provisioning.

BACKGROUND

Increasingly enterprises are faced with numerous internal users having different access requirements that span a large number of applications, networks, and systems. Maintaining the security of such modern dynamic enterprises is a critical and challenging task. In some industries, such as banking, the federal government has promulgated rules and regulations that require a certain degree of security. Thus, enterprises are not only concerned with their reputation but face potential civil liability for security breaches. The challenge lies in efficiently and securely provisioning system access to reflect constantly changing user responsibilities and computing environments.

Historic methods of manually granting individual user access on a resource by resource basis long ago proved administratively infeasible for organizations of even moderate size. Role Based Access Control (RBAC) systems advanced the art by attempting to secure and streamline user administration via constructing and maintaining a formal model of user privileges grouped into roles.

One problem with RBAC systems is that one RBAC for one enterprise may be entirely different than another RBAC for a different enterprise. Moreover, disparate enterprises are increasingly collaborating and partnering on the Internet to share resources, revenues, customers, expenses, etc. One impediment to seamless integration and collaboration lies in each different enterprise's security system or RBAC system. Often the solution to integration is a large-scale development effort that makes the two RBAC compatible with one another or that installs a single RBAC for both enterprises. However, such a development effort can prove too costly and time consuming and may even negate any perceived benefits of the two enterprises collaborating and integrating with one another. Consequently, security integration remains a significant development exercise and financial concern with cross enterprise collaboration and integration.

Accordingly, what are needed are mechanisms to better provision security roles for users.

SUMMARY

In various embodiments, techniques for virtualized federated role provisioning are provided. More specifically, and in an embodiment, a method is provided for packaging and distributing a virtualized federated role provisioning service to a remote environment. A role hierarchy is assembled having roles and constraints for resolving roles for a remote policy environment. Moreover, a policy decision point service is acquired to subsequently distribute policy disposition to a policy enforcement point service and which enables the policy enforcement point service to subsequently enforce the roles on resources in the remote policy environment. The role hierarchy and the policy decision point service are packaged as a virtual federated role provisioning service that is self contained and that is to independently process within the remote policy environment. Finally, the virtual federated role provisioning service is sent to the remote policy environment for subsequent initialization and operation to provide virtualized federated role provisioning within the remote policy environment.

DETAILED DESCRIPTION

Figure 1:
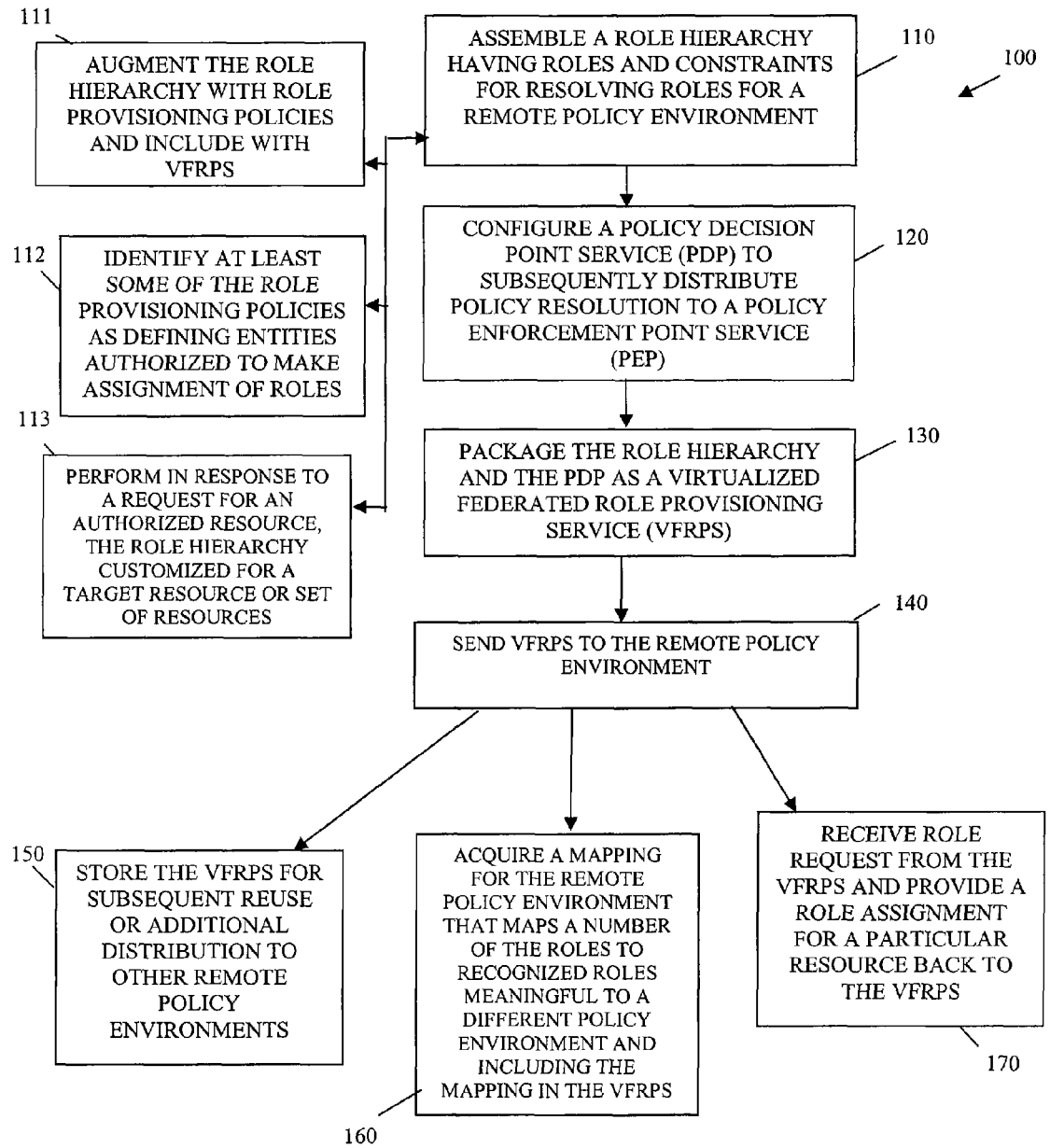
FIG. 1 is a diagram of a method for packaging and distributing a virtualized federated role provisioning service to a remote environment, according to an example embodiment.

A "resource" includes a user, content, a processing device, a node, a service, an application, a system, a directory, a data store, groups of users, combinations of these things, etc. Resources may represent physical or logical entities.

The term "service" and "application" may be used interchangeably herein and refer to a type of software resource that includes instructions, which when executed by a machine performs operations that change the state of the machine and that may produce output.

The term "remote" is used relatively herein. In other words, when the term "remote" is used as an adjective to a noun it is remote or external to some other entity being referenced within the context of the modified noun. So, as an example: a remote application to a service means that the remote application is external to a local environment and local network associated with the service. In other contexts, the service may be viewed as being remote to the application when it is expressed as: a remote service to an application. Within any given context herein, the term remote is used consistently to identify what entity is in fact remote to what other entity.

A "processing environment" refers to one or more physical processing devices organized within a local network. For example, several computers connected via a local area network (LAN) may collectively be viewed as a processing environment. The processing environment also refers to software configurations of the physical processing devices, such as but not limited to operating system, file system, directory service, etc. The phrase "processing environment" may be used synonymously herein with the phrase "physical processing environment when that phrase is not preceded by the term "virtual."

A "virtual processing environment" refers to a software constructed sub processing environment that is carved out from or superimposed on a portion of a physical processing environment. A single physical processing environment can have a plurality of different or cloned "virtual processing environments."

An "identity service" refers to a special type of service that is designed to manage and supply authentication services and authentication information for resources. So, an identity service may authenticate a given resource for access to a variety of local and external services being managed by that identity service. A single resource may have multiple identity services. In addition the identity service itself may be viewed as a type of resource. In this manner, identity service may authenticate and establish trust with one another viewing one another as specific type of resource.

According to an embodiment, some example identity services are described in "Techniques for Dynamically Establishing and Managing Authentication and Trust Relationships," filed on Jan. 27, 2004, and having the U.S. Ser. No. 10/765,523; "Techniques for Establishing and Managing a Distributed Credential Store," filed on Jan. 29, 2004, and having the U.S. Ser. No. 10/767,884; and "Techniques for Establishing and Managing Trust Relationships," filed on Feb. 3, 2004, and having the U.S. Ser. No. 10/770,677; all of which are commonly assigned to Novell, Inc., of Provo, Utah and the disclosures of which are incorporated by reference herein.

An identity service may also provide single sign-on services to a resource. That is, a resource may sign-on to an identity service and acquire identities and credentials to access a variety of other services or resources. In some cases, the identity service is modified or enhanced to perform some of the teachings presented herein and below.

A resource is recognized via an "identity." An identity is authenticated via various techniques (e.g., challenge and response interaction, cookies, assertions, etc.) that use various identifying information (e.g., identifiers with passwords, biometric data, hardware specific data, digital certificates, digital signatures, etc.). A "true identity" is one that is unique to a resource across any context that the resource may engage in over a network (e.g., Internet, Intranet, etc.). However, each resource may have and manage a variety of identities, where each of these identities may only be unique within a given context (given service interaction, given processing environment, given virtual processing environment, etc.).

The identity may also be a special type of identity that the resource assumes for a given context. For example, the identity may be a "crafted identity" or a "semantic identity." An example for creating and using crafted identities may be found in U.S. patent application Ser. No. 11/225,993; entitled "Crafted Identities;" filed on Sep. 14, 2005; and the disclosure of which is incorporated by reference herein. An example for creating and using semantic identities may be found in U.S. patent application Ser. No. 11/261,970; entitled "Semantic Identities;" filed on Oct. 28, 2005; and the disclosure of which is incorporated by reference herein.

A "virtual machine" (VM) may be viewed as a virtual processing environment discussed and described above. The VM is a logical machine that is independent of its physical process environment or physical machine. It may include its own operating system (OS), its own file system (FS), its own directory services, etc., which may each be different from the physical processing environment.

A VM may also be referred to herein as a "virtual distribution." That is, a virtual distribution is instantiated or started on a physical processing environment or machine to start a VM. Similarly, a physical processing environment may be referred to as a "physical distribution."

"Role Based Access Control" (RBAC) is a technique that specifies role relations, interactions, and restrictions as a part of a role object model. Stated another way, RBAC is a security model to administer system access rights based on role assignments and rules (role policy).

Various embodiments of this invention can be implemented in existing network architectures and RBAC systems. For example, in some embodiments the techniques presented herein are implemented in whole or in part in the Novell® network, proxy server products, operating system products, data center products, and/or directory services products distributed by Novell®, Inc. of Provo, Utah. More specifically, embodiments of the invention may be implemented in the Novell® Access Manager, Identity Manager Products, and Bandit projects among others.

A policy decision point (PDP) service makes decisions regarding policy and a policy enforcement point (PEP) service enforces those decisions made by the PDP. Similarly, as used herein, a PEP may discover that a certain role should be activated, but the PEP requests the PDP to activate that role and does not activate the role itself. So, the PDP evaluates role policy given information and renders a disposition, then the PEP enforces the disposition (i.e., allow the access if a particular role was activated by the PDP).

Of course, the embodiments of the invention can be implemented in a variety of architectural platforms, operating and server systems, devices, systems, or applications. Any particular architectural layout or implementation presented herein is provided for purposes of illustration and comprehension only and is not intended to limit aspects of the invention.

It is within this context, that various embodiments of the invention are now presented with reference to the FIGS. 1-6.

FIG. 1 is a diagram of a method 100 for packaging and distributing a virtualized federated role provisioning service to a remote environment. The method 100 (hereinafter "virtualized federated role-packaging service") is implemented as instructions in a non-transitory machine-accessible and non-transitory readable medium. The instructions when executed by a machine perform the processing depicted in the FIG. 1. The virtualized federated role-packaging service is also operational over and performs within a network. The network may be wired, wireless, or a combination of wired and wireless.

According to an embodiment, the features and processing of the federated role-defining service are integrated and incorporated within an enhanced version of an identity service. Examples of some identity services that may be enhanced to include the features of the federated role-defining service were supplied and incorporated by reference above.

The virtualized federated role-packaging service may be viewed as an originating site that provides an authoritative statement for policy, roles, role hierarchies, separation of duties between entities (static and dynamic), etc. Some of these statements may have a shared meaning with another different environment but not a shared processing definition. In other words, there is an agreement on the meaning of a particular role or permission but not on the process for activating, deactivating, interrogating, etc. the role or permission. The site of the virtualized federated role-packaging service and other sites are engaged in allowing trusted and federated information to be used among the sites. For example, a federated identity may be established or a crafted or semantic identity (as described and incorporated by reference above). An example architecture for the environment of the virtualized federated role-packaging service is presented below with reference to the FIG. 5.

The virtualized federated role-packaging service provides a mechanism for providing a virtualized policy decision point service (PDP) that may be used to provide federated role provisioning by the various sites even though the sites do not share a same policy environment. The creation of the virtualized federated role provisioning service (may also be used synonymously herein with virtualized PDP) may be done on demand by the virtualized federated role-packaging service, via a schedule, in response to an event or policy evaluation, etc.

At 110, the virtualized federated role-packaging service assembles a role hierarchy having roles and constraints for resolving roles for a remote policy environment. In an embodiment, the role hierarchy may include a single role. In other cases, the role hierarchy includes a plurality of interrelated roles. The constraints include logic or directives that define under what circumstances a particular role may be assigned to a resource. The constraints may also define a separation of duties, such that a particular entity is identified as being authorized to supply or evaluate a given constraint. So, some constraints may be placeholders that identify entities or resources, which can dynamically supply a populated constraint.

The role hierarchy includes roles organized in a hierarchical fashion. Some roles may inherit from other roles, assuming constraints or policy permits such role inheritance. Again, in some cases the hierarchy may include just a single role.

In an embodiment, at 111, the virtualized federated role-packaging service may augment the role hierarchy with role provisioning policies. The policies may be with respect to the entire role hierarchy, selective portions of the hierarchy, or even just a particular role defined within the hierarchy. The policies may also indicate that other policies are needed in some circumstances and from whom (what resource or entity) those other policies may be acquired.

According to an embodiment, at 112, the virtualized federated role-packaging service may identify at least some of the role provisioning policies as defining entities or resources authorized to make assignment of roles. In other words, the policies may define a separation of duties or responsibilities for particular resources or entities. A policy may define what resource is to supply a dynamic policy at run time within a remote policy environment where the virtualized PDP subsequently processes as a virtual machine.

In an embodiment, at 113, the virtualized federated role-packaging service may perform the assembling of the role hierarchy at 110 in response to a specific request from an authorized resource or entity. Thus, the role hierarchy may be customized for a particular target resource or for a particular set of target resources within the remote policy environment.

At 120, the virtualized federated role-packaging service configures a PDP to subsequently distribute policy resolution within the remote policy environment to a policy enforcement point service (PEP). That is, the virtualized federated role-packaging service configures an entirely self-contained and encapsulated processing and content environment for role provisioning by defining a virtualized PDP that is to subsequently process as a virtualized federated role provisioning service (virtualized PDP). This may entail imaging the execution environment of the virtualized PDP and defining content that the virtualized PDP will recognize when it is subsequently instantiated and run as a virtual machine (VM) within the remote policy environment.

At 130, the virtualized federated role-packaging service packages the role hierarchy and the PDP as a virtualized federated role provisioning service. Again, this is a self-contained execution and content environment that can independently process without any additional assistance within the remote policy environment when it is subsequently instantiated as a VM and processed.

At 140, the virtualized federated role-packaging service sends the virtualized federated role provisioning service to the remote policy environment. Other policy may dictate when and if the virtualized federated role provisioning service is instantiated and processed as a VM within the remote policy environment. So, the activation of the virtualized federated role provisioning service may be delayed in some instances and may occur in response to policy or defined events. In other cases, the VM may be initiated immediately upon receipt within the remote policy environment. It may also be self-loading and self-authenticating within the remote policy environment.

In an embodiment, at 150, the virtualized federated role-packaging service may store the virtualized federated role provisioning service within a repository or library for subsequent reuse or even for subsequent distribution to additional and other remote policy environments.

In some cases, at 160, the virtualized federated role-packaging service may acquire one or more mappings for the remote policy environment. The mapping maps a number of the roles to recognized and meaningful roles to different policy environments. This permits inter-enterprise integration, because roles of one enterprise may be mapped to roles meaningful to the other enterprise. The one or more mappings may be included with the role hierarchy and the virtualized federated role provisioning service when delivered to the remote policy environment.

It may also be the case, at 170 that the virtualized federated role-packaging service assist in a real-time and dynamic manner in resolving policy or role assignments on behalf of the virtualized federated role provisioning service when it operates as a VM within the remote policy environment. So, a role request may be received dynamically and in real time from the VM. In response to the role request, the virtualized federated role-packaging service provides a particular role assignment for a particular resource and communicates that assignment back to the VM (executing version of the virtualized federated role provisioning service).

The virtualized federated role-packaging service provides a federated role and policy virtualized processing environment for a target remote policy environment. This virtualized environment may be viewed as a virtualized PDP that is capable of communicating back with the virtualized federated role-packaging service once initiated as a VM. It may also include mappings to integrate disparate roles between different policy and role environments. The instantiation and usage of the virtualized PDP is described in greater detail below with reference to the FIG. 2.

Figure 2:
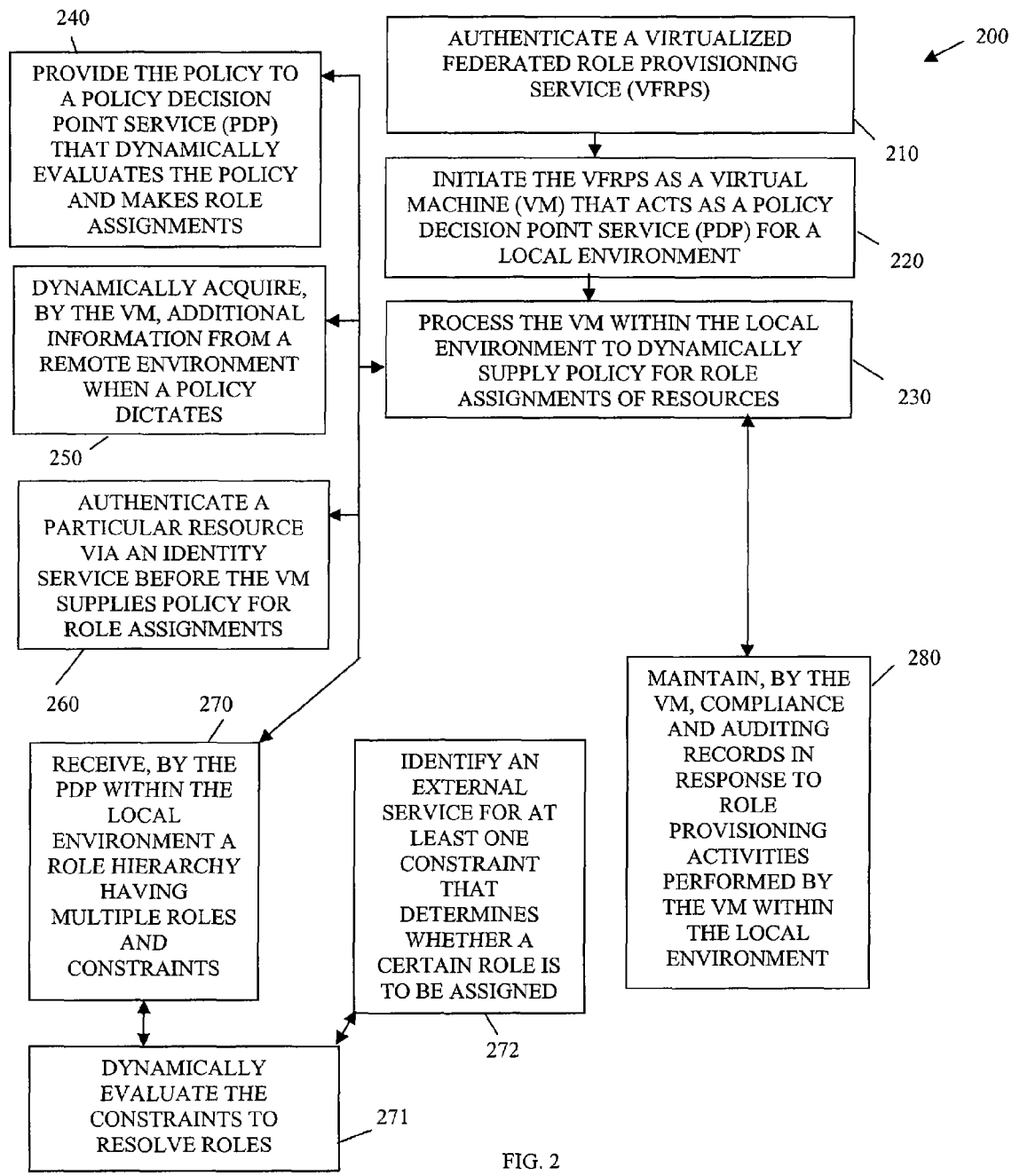
FIG. 2 is a diagram of a method for initiating and processing a virtualized federated role provisioning service within a local environment, according to an example embodiment.

FIG. 2 is a diagram of a method 200 for initiating and processing a virtualized federated role provisioning service within a local environment, according to an example embodiment. The method 200 (hereinafter "virtualized federated role provisioning initiation service") is implemented as instructions in a non-transitory machine-accessible and non-transitory readable medium. The instructions when executed by a machine perform the functions depicted in the FIG. 2. The processing is also operational over and performs within a network. The network may be wired, wireless, or a combination of wired and wireless. The virtualized federated role provisioning initiation service interacts with the virtualized role-packaging service represented by the method 100 of the FIG. 1 to receive virtualized federated role provisioning configurations for a given policy decision point service (PDP).

At 210, the virtualized federated role provisioning initiation service authenticates a virtualized federated role provisioning service or virtualized PDP. Any authentication technique may be used. As one example, the virtualized PDP may include a specialized service that is pre-configured to communicate with a local identity service and supply a temporary access token that a remote identity service supplied. The local identity service then validates the token with the remote identity service and may also validate a signature for the configuration of the virtualized PDP and if all is well supplies a permanent identity for the virtualized PDP to use within a local environment. It is understood that other techniques may be used to perform authentication of the virtualized PDP.

At 220, the virtualized federated role provisioning initiation service initiates the virtualized federated role provisioning service (virtualized PDP) as a virtual machine (VM). The VM processes as a self-contained PDP for the local environment in which it is installed and authenticated.

At 230, the virtualized federated role provisioning initiation service processes the VM within the local environment to dynamically supply policy for role assignments of resources.

In an embodiment, at 240, the virtualized federated role provisioning initiation service provides policy to a PDP while administering policy and roles for resources within the local environment. The PDP dynamically evaluates the policy and makes role assignments for resources.

According to an embodiment, at 250, the virtualized federated role provisioning initiation service via the VM dynamically acquires additional information from a remote environment when policy dictates. That is, some policy or constraints may dictate that a remote identity service or a remote PDP be consulted to acquire additional policy or constraints to use.

In an embodiment, at 260, the virtualized federated role provisioning initiation service authenticates a particular resource via an identity service before the VM supplies policy for role assignments to occur. So, the virtualized federated role provisioning initiation service may authenticate via a local or remote identity service the identities of requesting resources before distributing policy decisions used for role assignments.

In some situations, at 270, a PDP within the local environment may receive a role hierarchy having multiple roles and constraints for a given resource for which roles are being provisioned. The role hierarchy is received by the PDP from the VM. At 271, the PDP dynamically evaluates the constraints to resolve roles identified in the role hierarchy. In some cases, at 272, the PDP may identify and consult an external service for at least one constraint that determines whether a certain role is to be assigned to a particular resource. In other words, the PDP uses policy or a constraint to resolve a resource that supplies a role assignment to the PEP. In most situations, the PEP is within the local processing environment of the resource having roles assigned to it and the PEP enforces the access of assigned roles that were assigned by the PDP.

According to another embodiment, at 280, the virtualized federated role provisioning initiation service maintains via the VM compliance and auditing records in response to role provisioning activities performed by the VM within the local environment. Other policy may dictate what types of information is captured in the records, when the records are reported, and to whom and how the records are reported.

Figure 3:
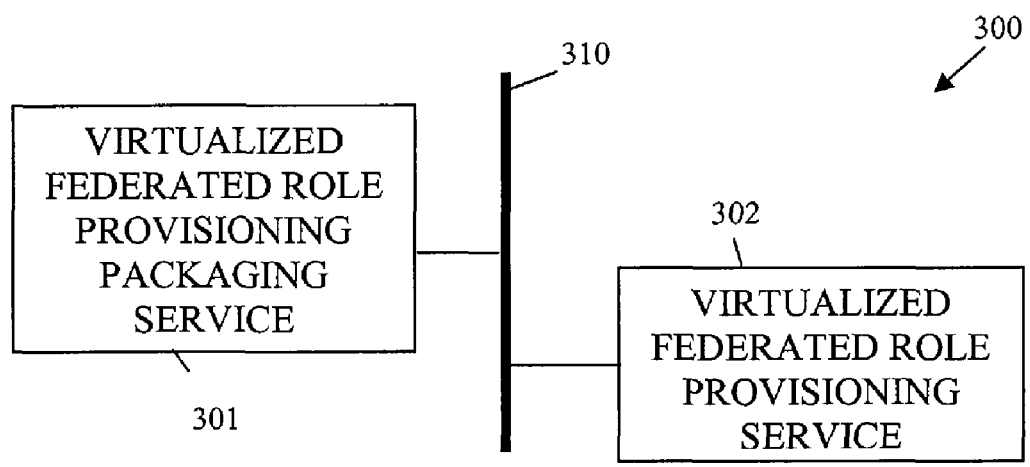
FIG. 3 is a diagram of a virtualized federated role provisioning system, according to an example embodiment.

FIG. 3 is a diagram of a virtualized federated role provisioning system 300, according to an example embodiment. The virtualized federated role provisioning system 300 is implemented as instructions in non-transitory machine-accessible and non-transitory readable media and is to process on multiple machines over a network. Thus, the virtualized federated role provisioning system 300 is operational over and performs within a network. The network may be wired, wireless, or a combination of wired and wireless. The virtualized federated role provisioning system 300 implements among other things the methods 100 and 200 of the FIGS. 1 and 2, respectively.

The virtualized federated role provisioning system 300 includes a virtualized federated role provisioning packaging service 301 and a virtualized federated role provisioning service 302. Each of these and their interactions with one another over a wide area network (WAN) 310 connection will now is discussed in turn. It is noted that in some embodiments the interactions may occur over a local area network as well, thus the embodiments presented herein are not to be exclusively limited to WAN based application as LAN based application may be used as well.

The virtualized federated role provisioning packaging service 301 is implemented in a machine-accessible medium and is to process on a remote machine within a remote environment over the network 310. Example processing associated with the virtualized federated role provisioning packaging service 301 was presented above and discussed in detail with reference to the method 100 of the FIG. 1.

The virtualized federated role provisioning packaging service 301 packages the virtualized federated role provisioning service 302 within a remote environment over a wide area network (WAN) 310. The virtualized federated role provisioning service 302 is packaged by the virtualized federated role provisioning packaging service 301 as a self-contained policy decision point service (PDP) having policy, roles, and constraints. The PDP dynamically supplies this information, when the PDP is operational as a VM within a local environment, to a policy enforcement point service (PEP). The PEP enforces access within the local environment for the role assignments. The PDP performs dynamic evaluation of the policy and the constraints.

In an embodiment, the virtualized federated role provisioning packaging service 301 assembles the roles as a role hierarchy. A number of the roles when assigned are capable of being inherited from other roles within the role hierarchy.

In another embodiment, the virtualized federated role provisioning packaging service 301 supplies a mapping to the virtualized federated role provisioning service 302. The mapping maps roles recognized by the local environment and services or resources of the local environment to one or more other target environments and their services or resources.

In still another situation, the virtualized federated role provisioning packaging service 301 dynamically assists the PDP when it is operational within the local environment for purposes of resolving policy and constraints for a number of the roles. That is, the virtualized federated role provisioning packaging service 301 may not just package the virtualized federated role provisioning service but may also dynamically assist in resolving and distributing policy and constraints in a dynamical and real-time manner to assist the virtualized federated role provisioning service when it processes as a VM within its local environment.

The virtualized federated role provisioning service 302 is implemented in a machine-accessible medium and is to process on a local machine within a local environment and is operational over the network 310. The virtualized federated role provisioning service 302 when authenticated and initiated within the local environment processes as a VM having a PDP.

The virtualized federated role provisioning service 302 dynamically authenticates a number of requesting resources via an identity service. The identity service may be in the local environment or may be in the remote environment. In some cases, the authentication of a particular resource identity may also permit specific policy to be distributed to the virtualized federated role provisioning service 302 via the identity service. The policy is subsequently supplied to a PEP for purposes of dynamically enforcing access rights for particular role assignments assigned to the resources.

Example processing and features associated with the virtualized federated role provisioning service 302 was presented and described in detail above with reference to the method 200 of the FIG. 2.

Figure 4:
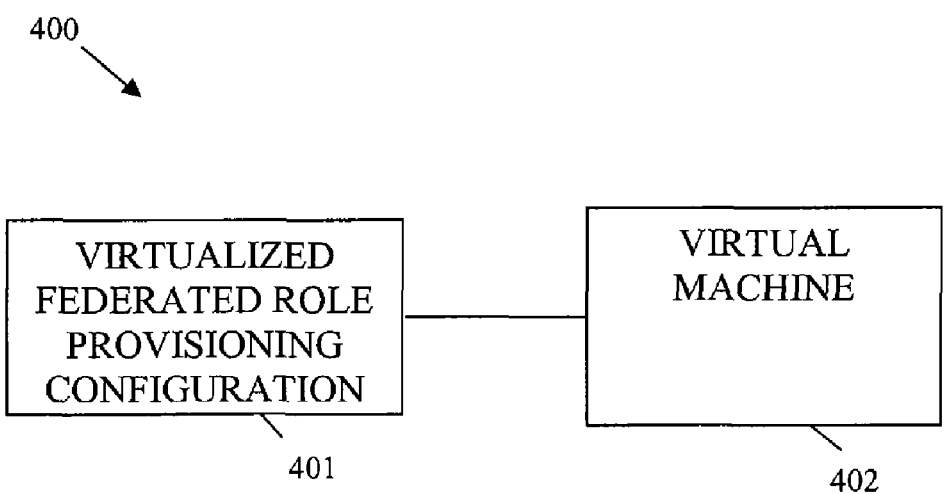
FIG. 4 is a diagram of another virtualized federated role provisioning system, according to an example embodiment.

FIG. 4 is a diagram of another virtualized federated role provisioning system 400, according to an example embodiment. The virtualized federated role provisioning system 400 is implemented within a non-transitory machine-accessible and non-transitory readable medium and may be processed on one or more machines. The virtualized federated role provisioning system 400 when executed by a machine performs, among other things, at least some of the processing depicted in FIGS. 1-3. The virtualized federated role provisioning system 400 is also operational over a network and the network may be wired, wireless, or a combination of wired and wireless. The virtualized federated role provisioning system 400 presents an alternative arrangement and perspective to the virtualized federated role provisioning system 300 presented with respect to the FIG. 3.

The virtualized federated role provisioning system 400 includes virtualized federated role provisioning configuration 401 and a virtual machine 402. Each of these and their interactions with one another over a network will now be discussed in turn.

The virtualized federated role provisioning configuration 401 is implemented in a machine-accessible and readable medium and is accessible to processes or services from machines of the network. The virtualized federated role provisioning configuration 401 defines a configuration for a virtual machine (VM). The virtualized federated role provisioning configuration 401 includes a shared PDP that is shared between a local and remote environment. The virtualized federated role provisioning configuration 401 also includes a role and policy enforcement environment. The role and policy enforcement environment defines policies, roles, and constraints for dynamically assigning particular ones of the roles to requesting resources within the local environment.

The virtualized federated role provisioning configuration 401 may also define which services that can permissibly supply some of the policies, roles, and constraints.

According to an embodiment, the virtualized federated role provisioning configuration 401 may also define a role hierarchy that includes the roles hierarchically organized in relationships to one another. Some of the roles may be inherited by other ones of the roles.

The virtualized federated role provisioning configuration 401 may also identify an identity service that the shared PDP can consult during operation within the local environment to authenticate the requesting resources and to in some cases to acquire a number of the policies or additional policies.

The virtualized federated role provisioning configuration 401 may also identify a remote service that the shared PDP can consult during operation within the local environment to acquire a number of the policies in a dynamic and real-time manner.

The virtual machine (VM) 402 is implemented in a machine-accessible and readable medium and is to process as instructions on one or more machines within a local environment. The VM 402 provides a local policy and role enforcement environment that is self-contained and processes the shared PDP. Policy decisions are made and supplied to a PEP where roles are dynamically enforced for resources. The roles assigned to a resource are used to determine other access permissions and policies for use with the resource within the local environment.

Figure 5:
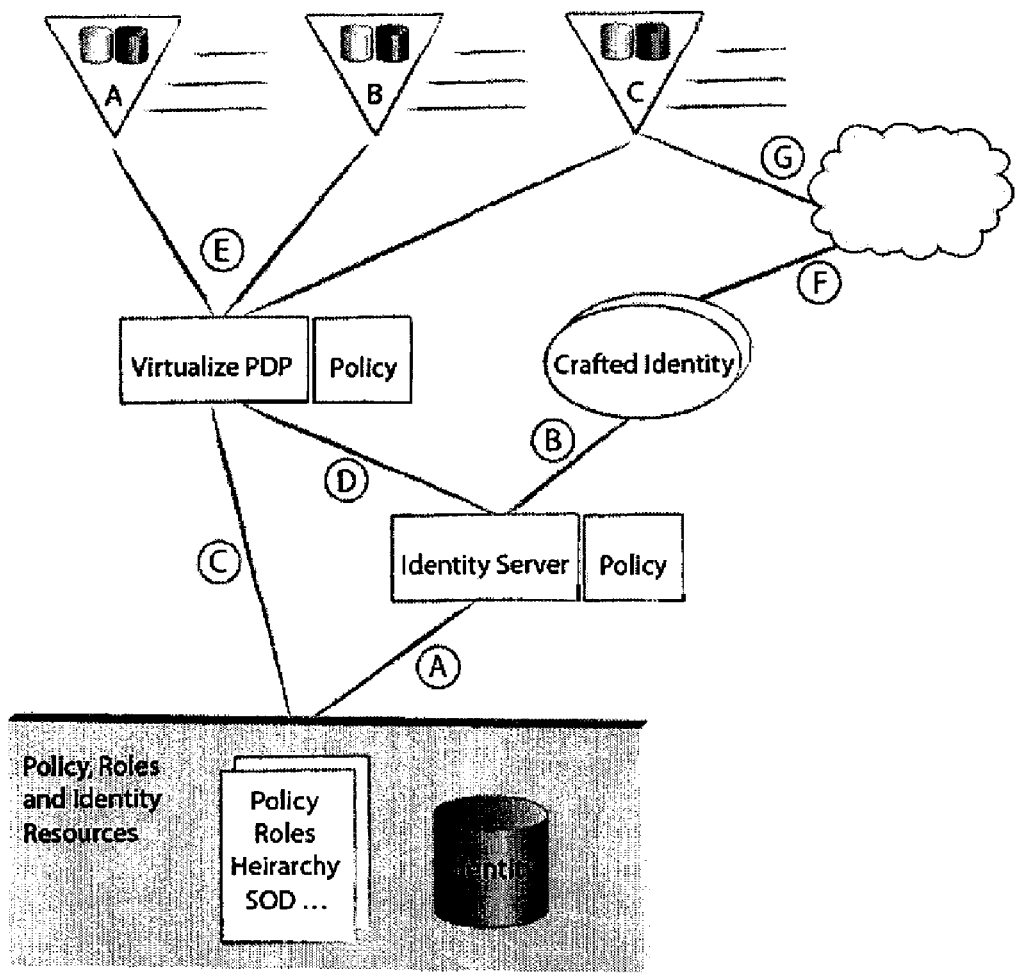
FIG. 5 is a diagram of an architecture for a virtualized federated role provisioning packaging and distribution service, according to an example embodiment.

FIG. 5 is a diagram of an architecture for a virtualized federated role provisioning packaging and distribution service, according to an example embodiment.

Initially, a virtualized PDP is created by an authoritative source for subsequent utilization by other sites that do not share the same policy environment as the authoritative source. A virtualized PDP is constructed via A, B, C, D, and E. Previous virtualized PDP's may be acquired via libraries or repositories (also labeled via A, B, and C in the inverted triangles). The construction of the virtualized PDP is itself guided by policy to assure that everything needful is included in the virtualized PDP including subsets of the definitions of policies, roles, role hierarchy, separation of duty, etc. via C. The result is the creation of a VM that is a PDP with an encapsulation of the information needed to perform PDP dispositions at the a remote site. Again, the creation of a virtualized PDP can be done ahead of time or on demand.

In an example situation, an identity for a resource (in some situations the identity may be a crafted or semantic identity) is sent to a remote site or remote policy environment via F as a result of a processing request (e.g., workflow, purchase transaction, etc.). At either the same time as F or prior to F a copy of the virtualized PDP encapsulating the policy environment that an identity for a resource being sent via F is provided to the remote site via G.

Figure 6:
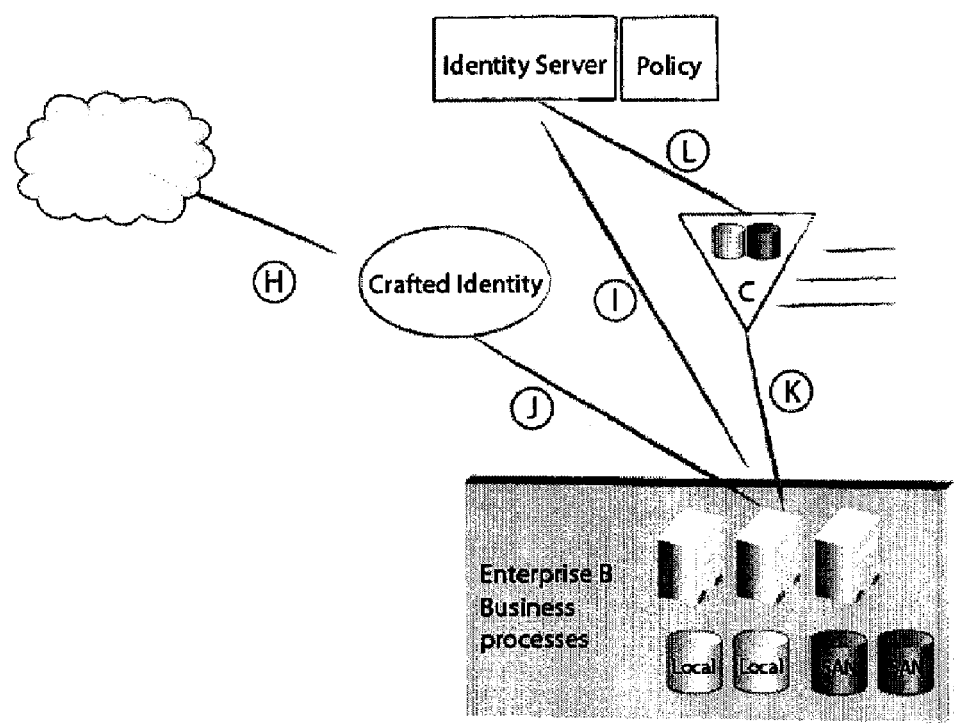
FIG. 6 is a diagram of an architecture for a local environment that processes a virtualized federated role provisioning service, according to an example embodiment.

FIG. 6 is a diagram of an architecture for a local environment that processes a virtualized federated role provisioning service, according to an example embodiment.

Both the identity and the virtualized PDP are received by the remote site via H (remote site is labeled as Enterprise B). Enterprise B can continue normal data-to-day operations; but, since Enterprise B is interoperating with another site, anytime a processing request is made concerning an external identity via J, the processing first validates the identity via I and then acts as a PEP by requesting a PDP disposition from the virtualized PDP via K.

The contents of the identity coupled with the policy, role, hierarchy, etc. information encapsulated in the virtualized PDP allows the virtualized PDP to provide a disposition via K that is in full harmony with the policy environment where the identity came from and it is already mapped to something that Enterprise B understands because the agreed upon mapping policy is held within the virtualized PDP.

Although not shown in FIG. 6, the virtualized PDP may also make an information request back to the packaging service or another enterprise if policy so dictates that certain information cannot be encapsulated or must be obtained in real time.

It is now apparent through the techniques presented herein that by encapsulating role relationships and constraints, role calculation can be achieved via early (at user or resource authentication) times and via late binding (at role-membership query for authorization/operational policy purposes) by virtualizing the PDP and providing processing logic and data (role, policy, etc.) in a self-contained manner. Additionally, the techniques provide a federated mechanism for calculating role hierarchy and separation of duty limitations without remote sites having to incorporate the processing logic into its code base. Also, a virtualized and federated mechanism has been described for evaluating dynamic role membership constraints. Furthermore, a mechanism has been defined for extending role inheritance across identity federations using virtualized and shared PDP's. The virtualized PDP can hold how role calculations are being performed in a private and secure manner within the remote site. Moreover, the virtualized PDP can communicate back to the authoritative (packaging) source or even an authentication identity service regarding the usage or roles within the remote environment.

This can be used to facilitate compliance and assurance that the terms and usage of the roles has not been violated.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

The Abstract is provided to comply with 37 C.F.R. §1.72(b) and will allow the reader to quickly ascertain the nature and gist of the technical disclosure. It is submitted with the understanding that it will not be used to interpret or limit the scope or meaning of the claims.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus the following claims are hereby incorporated into the Description of the Embodiments, with each claim standing on its own as a separate exemplary embodiment.

The invention claimed is:

1. A method implemented in a non-transitory machine-readable medium and to execute on a machine, comprising:
   authenticating, by the machine, a virtualized federated role provisioning service by using a specialized service that is preconfigured to communicate with a local identity service within a local environment and supply a temporary access token that was supplied by a remote identity service, the local identity service validates the temporary access token with the remote identity service and validates a signature for a configuration of the virtualized federated role provisioning service and the remote identity service then supplies a permanent identity for the virtualized federated role provisioning service to use within the local environment;
   initiating, by the machine, the virtualized federated role provisioning service as a virtual machine that acts as policy decision point service for the local environment; and
   processing, by the machine, the virtual machine within the local environment to dynamically supply policy for role assignments of resources, the virtual machine independent processes without any additional assistance within the local environment when it is subsequently initiated as the virtual machine and processed and represents a self-contained and encapsulated execution and content environment for the local environment.

2. The method of claim 1 further comprising, providing, by the machine, the policy disposition to a policy enforcement point service that dynamically enforces the role assignments on the resources.

3. The method of claim 1 further comprising, dynamically acquiring, by the virtual machine and on the machine, additional information from a remote environment when a particular policy dictates that the additional information be acquired in real time from the remote environment.

4. The method of claim 1 further comprising, authenticating, by the machine, a particular resource via an identity service before the virtual machine makes a decision and supplies the policy.

5. The method of claim 1 further comprising, receiving, by a policy enforcement point service within the local environment and on the machine, a role hierarchy having multiple roles and constraints, and wherein the role hierarchy is received from the virtual machine.

6. The method of claim 5 further comprising, dynamically evaluating, by the machine, the constraints to resolve particular roles for a particular resource within the local environment.

7. The method of claim 6, wherein dynamically evaluating further includes identifying, by the machine, an external service for at least one of the constraints that is to determine whether a certain role is to be assigned for the particular resource.

8. The method of claim 1 further comprising, maintaining, by the virtual machine and on the machine, compliance and auditing records in response to role provisioning activities performed by the virtual machine within the local environment.

9. A system, comprising:
   a virtualized federated role provisioning packaging service implemented in a non-transitory machine-accessible and readable medium and to process on a remote machine within a remote environment; and
   a virtualized federated role provisioning service implemented in a non-transitory machine-accessible and readable medium and to process on a local machine within a local environment, the virtualized federated role provisioning packaging service is to package the virtualized federated role provisioning service within the remote environment as a self-contained policy decision point service having policy, roles, and constraints that the policy decision point service dynamically supplies when operational within the local environment to a policy enforcement point service to assign the roles to resources in response to dynamic evaluation of the policy and the constraints, and the virtualized federated role provisioning service when authenticated and initiated within the local environment processes as a virtual machine having the policy decision point service, the virtualized federated role provisioning service authenticated by using a specialized service that is preconfigured to communicate with a local identity service within the local environment and supply a temporary access token that was supplied by a remote identity service, the local identity service validates the temporary access token with the remote identity service and validates a signature for a configuration of the virtualized federated role provisioning service and the remote identity service then supplies a permanent identity for the virtualized federated role provisioning service to use within the local environment, the virtualized federated role provisioning service packaged as a self contained execution and content environment that independently processes without any additional assistance within the remote environment when it is subsequently initiated as the virtual machine and processed.

10. The system of claim 9, wherein the virtualized federated role provisioning packaging service is to assemble the roles as a role hierarchy, and wherein a number of the roles when assigned are inherited from other roles within the role hierarchy.

11. The system of claim 9, wherein the virtualized federated role provisioning packaging service is to obtain and then supply a mapping to the virtualized federated role provisioning service that maps roles recognized by the local environment to one or more other target environments.

12. The system of claim 9, wherein the virtualized federated role provisioning packaging service is to dynamically assist the policy decision point service when it is operational within the local environment in resolving policy and constraints for a number of the roles.

13. The system of claim 9, wherein the policy decision point service when operational is to dynamically authenticate a number of resources via an identity service and dynamically acquire some policy in response to the authentication from the identity service, and wherein that policy is supplied to the policy enforcement point service to dynamically enforce a number of the roles on the resources.

* * * * *